(12) United States Patent
Ayyar et al.

(10) Patent No.: US 8,457,139 B2
(45) Date of Patent: Jun. 4, 2013

(54) SYSTEMS, METHODS, AND COMPUTER READABLE MEDIA FOR LOOSE COUPLING OF MULTIMEDIA RESOURCE FUNCTION CONTROLLERS AND MULTIMEDIA RESOURCE FUNCTION PROCESSORS

(75) Inventors: Kodandaraman S. Ayyar, Plano, TX (US); Edward K. Ansong, Richardson, TX (US); Ken H. Le, Richardson, TX (US); Yong Tai Chen, Plano, TX (US)

(73) Assignee: Genband US LLC, Plano, TX (US)

( * ) Notice: Subject to any disclaimer, the term of this patent is extended or adjusted under 35 U.S.C. 154(b) by 368 days.

(21) Appl. No.: 12/757,780

(22) Filed: Apr. 9, 2010

(65) Prior Publication Data
US 2011/0249681 A1  Oct. 13, 2011

(51) Int. Cl.
*H04L 12/28* (2006.01)

(52) U.S. Cl.
USPC .......... 370/401; 370/352; 370/253; 370/400; 370/402

(58) Field of Classification Search
USPC ... 370/352, 353, 400, 401, 402; 455/517–521
See application file for complete search history.

(56) References Cited

U.S. PATENT DOCUMENTS

| | | | |
|---|---|---|---|
| 6,600,738 B1 | 7/2003 | Alperovich et al. | |
| 6,683,877 B1 | 1/2004 | Gibbs et al. | |
| 6,799,210 B1 | 9/2004 | Gentry et al. | |
| 7,003,280 B2 * | 2/2006 | Pelaez et al. | 455/406 |
| 7,024,197 B2 * | 4/2006 | Verma et al. | 455/445 |
| 7,031,747 B2 * | 4/2006 | Cyr et al. | 455/552.1 |
| 7,295,843 B2 * | 11/2007 | Ejzak et al. | 455/442 |
| 7,356,841 B2 | 4/2008 | Wilson et al. | |
| 7,586,857 B2 * | 9/2009 | Ejzak et al. | 370/260 |
| 7,603,433 B1 * | 10/2009 | Paterik | 709/217 |
| 7,672,297 B2 * | 3/2010 | Naqvi et al. | 370/352 |
| 7,840,701 B2 | 11/2010 | Hsu et al. | |
| 7,984,130 B2 * | 7/2011 | Bogineni et al. | 709/223 |
| 8,018,955 B2 * | 9/2011 | Agarwal et al. | 370/401 |
| 2003/0235184 A1 | 12/2003 | Dorenbosch et al. | |
| 2004/0121775 A1 * | 6/2004 | Ropolyi et al. | 455/445 |
| 2004/0252681 A1 | 12/2004 | Rabipour et al. | |
| 2006/0039397 A1 | 2/2006 | Hari et al. | |

(Continued)

FOREIGN PATENT DOCUMENTS

WO  WO 2011/022662 A2  2/2011

OTHER PUBLICATIONS

Notification of Transmittal of the International Search Report and the Written Opinion of the International Searching Authority, or the Declaration for International Application No. PCT/US2010/046186 (Apr. 21, 2011).

(Continued)

*Primary Examiner* — Andrew Lai
*Assistant Examiner* — Andrew C Lee
(74) *Attorney, Agent, or Firm* — Jenkins, Wilson, Taylor & Hunt, P.A.

(57) ABSTRACT

Systems, methods, and computer readable media for loose coupling media resource function controllers (MRFCs) and media resource function processors (MRFPs) are disclosed. According to one aspect, the subject matter described herein includes a method for loose coupling MRFCs and MRFPs. The method includes providing one or more MRFPs having media processing resources simultaneously usable by a plurality of MRFCs, and at one of the MRFPs, allowing a plurality of MRFCs to simultaneously use the media processing resources of the MRFP.

29 Claims, 5 Drawing Sheets

U.S. PATENT DOCUMENTS

| | | | |
|---|---|---|---|
| 2006/0116150 A1* | 6/2006 | Bhutiani | 455/518 |
| 2007/0047707 A1 | 3/2007 | Mayer et al. | |
| 2008/0002665 A1 | 1/2008 | Soo et al. | |
| 2008/0091827 A1* | 4/2008 | Mo et al. | 709/226 |
| 2008/0212943 A1* | 9/2008 | Frohlich et al. | 386/124 |
| 2008/0288951 A1* | 11/2008 | Lin et al. | 718/104 |
| 2008/0301747 A1* | 12/2008 | Yan et al. | 725/118 |
| 2008/0307108 A1* | 12/2008 | Yan et al. | 709/231 |
| 2008/0317055 A1 | 12/2008 | Zetterlund et al. | |
| 2009/0303983 A1 | 12/2009 | Kennedy | |
| 2011/0047282 A1 | 2/2011 | Denman et al. | |

OTHER PUBLICATIONS

"Session border controller," Wikipedia, http://en.wikipedia.org/wiki/Session_border_controller (Aug. 4, 2009).

"3rd Generation Partnership Project; Technical Specification Group Services and System Aspects; General Packet Radio Service (GPRS) enhancements for Evolved Universal Terrestrial Radio Accesss Network (E-UTRAN) access (Release 9)," 3GPP TS 23.401, V9.1.0, pp. 1-234 (Jun. 2009).

"3rd Generation Partnership Project; Technical Specification Group Services and System Aspects; IP Multimedia Subsystem (IMS); Stage 2 (Release 9)," 3GPP TS 23.228, V9.0.0, pp. 1-250 (Jun. 2009).

"3rd Generation Partnership Project; Technical Specification Group Services and System Aspects; Network architecture (Release 9)," 3GPP TS 23.002, v9.0.0, pp. 1-92 (Jun. 2009).

"3rd Generation Partnership Project; Technical Specification Group Services and System Aspects; Vocabulary for 3GPP Specifications (Release 9)," 3GPP TR 21.905, V9.2.0, pp. 1-57 (Jun. 2009).

"3rd Generation Partnership Project; Technical Specification Group Services and System Aspects; System enhancements for the use of IMS services in local breakout and optimal routeing of media (Release 9)," 3GPP TR 23.894, V1.1.1, pp. 1-44 (Apr. 2009).

"3rd Generation Partnership Project; Technical Specification Group Core Network and Terminals; IP Multimedia (IM) session handling; IM call model; Stage 2 (Release 8)," 3GPP TS 23.218, V8.4.0, pp. 1-57 (Dec. 2008).

"cdma2000 Wireless IP Network Standard: Introduction," 3GPP2, 3GPP2 X.S0011-001-D, Version 2.0 (Nov. 2008).

Cumming, "SBC in NGN Architectures," Data Connection Limited, pp. 1-8 (Copyright 2006).

Schulzrinne et al., "RTP Payload for DTMF Digits, Telephony Tones and Telephony Signals," RFC 2833, pp. 1-30 (May 2000).

Final Official Action for U.S. Appl. No. 12/860,605 (Jul. 2, 2012).

Applicant-Initiated Interview Summary for U.S. Appl. No. 12/860,605 (May 2, 2012).

Non-Final Official Action for U.S. Appl. No. 12/860,605 (Feb. 1, 2012).

* cited by examiner

SYSTEMS, METHODS, AND COMPUTER READABLE MEDIA FOR LOOSE COUPLING OF MULTIMEDIA RESOURCE FUNCTION CONTROLLERS AND MULTIMEDIA RESOURCE FUNCTION PROCESSORS

TECHNICAL FIELD

The subject matter described herein relates to methods, systems, and computer readable media for interaction between telecommunications elements within a telecommunications network. More particularly, the subject matter described herein relates to systems, methods, and computer readable media for loose coupling of multimedia resource function controllers (MRFCs) and multimedia resource function processors (MRFPs).

BACKGROUND

The standards and protocols of Internet protocol (IP) multimedia subsystem (IMS) networks and next generation networks (NGNs) are defined in a number of documents and technical specifications, such as in $3^{rd}$ generation partnership project (3GPP) technical specifications TS 21.905, TS 23.002, TS 23.218, TS 23.228, TS 23.401, and TS 23.894, the disclosures of which are incorporated by reference herein in their entireties.

One challenge faced by telecommunications networks is that media streams, whether they be audio streams, such as voice data for a telephone call or digitally encoded music or tonal data for fax calls or dual-tone multi-frequency (DTMF)-related relays, video streams, such as digitally encoded video, or other types of media, may be in a variety of formats. For example, there are a variety of encoder/decoder, or codec, standards for digitally encoded voice, fax, dial tones or other data. These codecs may encode and optionally compress data using different methods or techniques. Examples of popular voice codes include ITU-T G.711, ITU-T G.726 (ADPCM), and 3GPP GSM adaptive multi-rate (AMR). Audio and tonal codecs include MPEG-1 Layer 3 (MP3), free lossless audio codec (FLAG), fax-related codecs, such as T.38 fax relay, and DTMF relay (e.g., as described in RFC 2833). Video codecs include MPEG-4 Part 2, H.264, and others. In addition, image or video data may have a particular image size or screen size, resolution, number of colors, and other characteristics.

In order for communication to occur between two devices (e.g., two cell phones, a fax machine and a computer, etc.) using different codecs from the other, for example, the telecommunications network must provide some form of transcoding to convert a media stream from one codec to another codec. This transcoding operation, along with other media related functions such as media manipulation (e.g. voice stream mixing) and playing of tones (e.g., using a DTMF relay) and announcements, may be performed by a media-adaptation resource, which may be implemented in hardware, software, or both, at a multimedia resource function processor (MRFP).

Telecommunications networks typically have multiple MRFPs. Each MRFP typically has one or more media-adaptation resources. For example, MRFPs (e.g., media servers) may have shelves with a number of voice cards and/or digital signaling processors (DSPs), each card containing one or more media-adaptation resources.

Conventionally, MRFPs are tightly coupled to an MRFC. That is, a single MRFC typically controls resources of a plurality of MRFPs. When requests for resources are sent to a controlling MRFC, the MRFC determines appropriate MRFPs and requests available resources from the MRFPs. While a tightly coupled controller-processor system may be useful for monitoring permanent or semi-permanent resources, such as resources in a media gateway tied to physical terminations in a circuit network, a tight coupling between MRFCs and MRFPs provides poor scalability and is inefficient in utilizing MRFPs' resources.

Thus, there exists a need for systems, methods, and computer readable media for loose coupling of MRFCs and MRFPs.

SUMMARY

According to one aspect, the subject matter described herein includes a method for loose coupling of MRFCs and MRFPs. The method includes providing one or more MRFPs having media processing resources simultaneously usable by a plurality of MRFCs, and at one of the MRFPs, allowing a plurality of MRFCs to simultaneously use the media processing resources of the MRFP.

According to another aspect, the subject matter described herein includes a system for loose coupling of MRFCs and MRFPs. The system includes one or more MRFPs having media processing resources simultaneously usable by a plurality of MRFCs, and a plurality of MRFCs for simultaneously using the media processing resources of the one or more MRFPs.

The subject matter described herein for loose coupling MRFCs and MRFP may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for loose coupling of MRFCs and MRFPs. As used herein, "loose coupling", "loosely coupled", "loosely coupled system", and similar terminology refers to an MRFP capable of providing media processing resources to multiple MRFCs. For example, in a loosely coupled system of MRFCs and MRFPs, multiple MRFCs are capable of requesting and receiving virtual facilities or resources from the MRFP simultaneously. As used herein, the terms "virtual resources", "ephemeral resources", and "virtual facilities" may be used interchangeably and generally refer to media processing resources associated with packet networks. For example, virtual resources may include voice over IP (VoIP) resources that are dynamically assigned or use ephemeral terminations, such as media adaptation resources at digital signal processor (DSP) or voice cards. In contrast, physical or permanent resources refer to resources that are associated with permanent or semi-permanent terminations, such as resources associated with physical terminations (e.g., TDM (time division multiplex) channels or ATM (asynchronous transfer mode) PVCs (permanent virtual circuit). As used hereinafter, MRFP resources (also referred herein as "media processing resources", "voice over IP (VoIP) resources", or simply "resources") will generally refer to media processing resources that may be requested by one or more MRFCs in a loosely coupled system, including but not limited to media adaptation resources.

Loose coupling of MRFPs and MRFC as described herein can provide many advantages. In particular, loose coupling may allow MRFP resources to be more effectively utilized and, thus, may be more cost effective (e.g., for network or service providers). For example, a loosely coupled system of MRFCs and MRFPs may allow multiple controllers to request resources that could go unutilized in a tightly coupled or single controller system. Additionally, loose coupling may be scalable by allowing nodes to be added or removed dynamically or as needed. For example, if all media adaptation resources are being used but signaling resources are available, an MRFP may be added without adding a new MRFC. In a second example, if all the signaling resources are being used but media adaptation resources are still available, an MRFC may be added without adding a new MRFP.

Additionally, while some embodiments described herein generally refer to MRFCs and MRFPs, it will appreciated by one of ordinary skill in the art that the concepts described herein can be applied to other communication nodes or networks. For example, resource-containing elements in a 2G or 3G mobile networks, such as media gateways (MGs), may be loosely coupled to controller elements, such as media gateway controllers.

Reference will now be made in detail to exemplary embodiments of the present invention, examples of which are illustrated in the accompanying drawings. Wherever possible, the same reference numbers will be used throughout the drawings to refer to the same or like parts.

Figure 1:
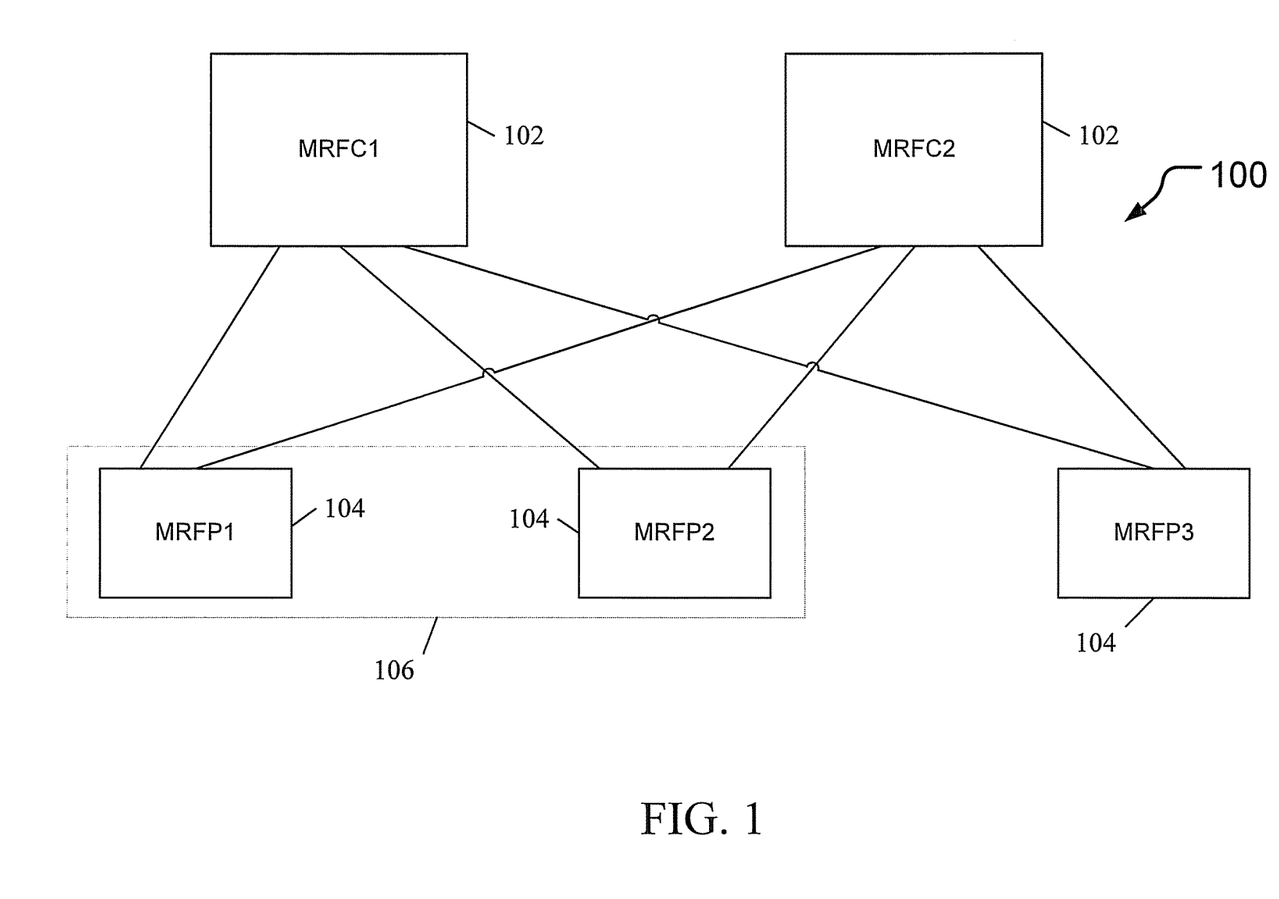
FIG. 1 is a block diagram illustrating an exemplary system for loose coupling of multimedia resource function controllers (MRFCs) and multimedia resource function processors (MRFPs) according to an embodiment of the subject matter described herein.

FIG. 1 is a block diagram illustrating an exemplary system for loose coupling of MRFCs and MRFPs according to an embodiment of the subject matter described herein. In the embodiment illustrated in FIG. 1, telecommunications network 100 is an IMS network and includes one or more MRFCs 102 and one or more MRFPs 104 loosely coupled. For example, a plurality of MRFCs 102 can request virtual facilities from one or more MRFPs 104, and MRFPs 104 can accept or fulfill requests from MRFCs 102. Referring to FIG. 1, lines between MRFCs 102 and MRFPs 104 represents communications for requesting and providing media processing resources, such as media adaptation resources for IP-to-IP transcoding. For example, multiple MRFCs 102 can simultaneously request media processing resources (e.g., media adaptation resources for IP to IP transcoding) of an MRFP 104. MRFP 104 may receive requests from MRFCs 104 and provide resources. In the embodiment illustrated in FIG. 1, MRFCs 102 and MRFPs 104 are connected using a mesh architecture. Mesh architecture in a loosely coupled system may allow flexibility. For example, mesh architecture may provide an MRFC 102 access to any of MRFPs 104 and vice versa.

MRFCs 102 and MRFPs 104 may be functionality in one or more communication nodes, elements, or functions. In one embodiment, an MRFP 104 is functionality in one of: a media gateway, a gateway function, a media server, a transition gateway (TrGW), an interconnect border gateway function (I-BGF), a core border gateway function (C-BGF), a media resource function (MRF), and an access border gateway function (A-BGF). In one embodiment, an MRFC 102 is functionality in one of: a media gateway controller (MGC), a policy decision function (PDF), a softswitch, an mobile switching center (MSC) server, a media server, an application server (AS), a media resource function (MRF), and an interconnect border control function (IBCF). It will be appreciated that MRFC functionality and MRFP functionality may be included in the same node, element, or function. For example, MRFC 102 and MRFP 104 may be functionality in a media resource function (MRF) node. MRFC and MRFP functionality in one or more of the above entities may be referred to as a virtual entity. For example, a media gateway may include functionality for a plurality of MRFPs. This functionality may be referred to as one or more virtual media gateways. Similarly, a media gateway controller may include functionality for a plurality of MRFCs. This functionality may be referred to as one or more virtual media gateway controllers.

Configuration or setup of a loosely coupled system may include interaction with a variety of entities, including, for example, network operators, management systems, and nodes in network 100. In one embodiment, one or more MRFCs 102 and MRFPs 104 may be configured or made aware of relevant counterparts. For example, at an initial time (e.g., initialization or run-time), each MRFP 104 and MRFC 102 may be made aware of nodes for communicating in a loosely coupled system. In one embodiment, MRFPs 104 may be configured with a list of MRFCs 102 that are allowed to use resources of MRFP 104 and MRFCs 102 may be configured with a list of MRFPs 104 whose resources can be used. In one embodiment, MRFCs 102 and MRFPs 104 may be configured using at least one of a predetermined list, a communications node, a network operator; and network analysis. For example, an MRFC 102 may be configured by an element management system (EMS) node or may be configured by a network operator. In a second example, an MRFP 104 may be configured by a predetermined list provided by an EMS, an MRFC 102 (or other node in Network 100), or an network operator. In a third example, network analysis may be used in coupling MRFCs 102 and MRFPs 104. For example, traffic load relating to transcoding resources may be monitored. In one embodiment, a loosely coupled system may be scaled or updated according to traffic load. For example, using monitored or predicted load, one or more nodes may be added or removed to a loosely coupled system. In one embodiment, MRFCs 102 and MRFPs 104 may be added independent of each other.

One or more MRFPs 104, or portions of MRFPs 104, may be logically grouped into a resource pool or logical resource group (LRG) 106. In one embodiment, LRG 106 may include one or more media adaptation resources of one or more MRFPs 104. LRG 106 may also be referred to as a virtual media gateway or virtual media server. LRG 106 may be used in load balancing or selection algorithms for selecting media processing resources to use for calls, transactions, or applications (e.g., MRFC1 102 may request resources from LRG 106 before requesting resources of MRFP3 104 for calls originating in San Francisco, Calif.). Further description and examples of selection algorithms may be found in commonly assigned, co-pending U.S. Provisional Patent Application Ser. No. 61/236,055, entitled "Systems, Methods, and Computer Readable Media for Selecting an Optimal Media Adaptation Resource for Latency-Sensitive Applications", the disclosure of which is incorporated herein by reference in its entirety.

Figure 2:
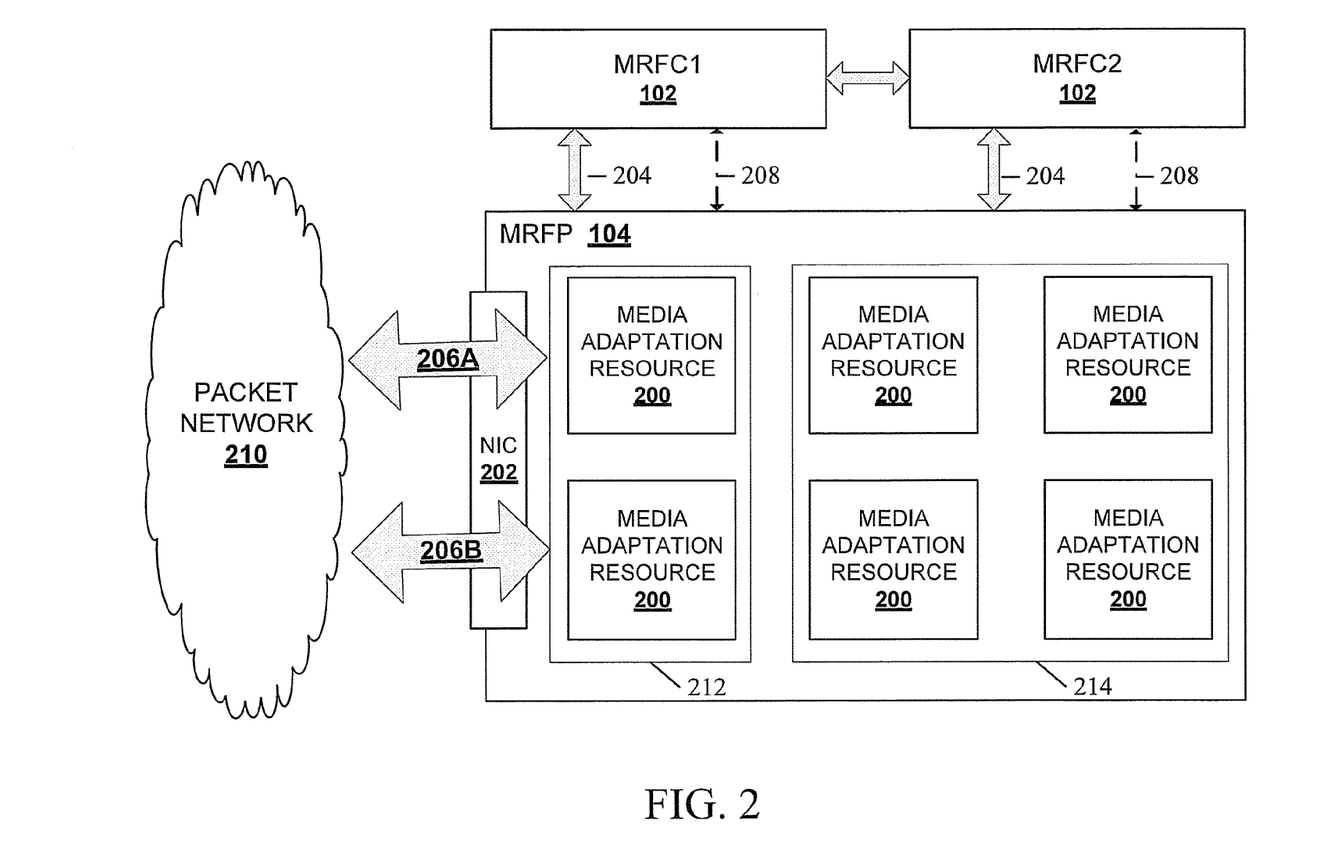
FIG. 2 is a block diagram illustrating media processing resources of an MRFP according to an embodiment of the subject matter described herein flow chart.

FIG. 2 is a block diagram illustrating media processing resources of an MRFP according to an embodiment of the subject matter described herein. In the embodiment illustrated in FIG. 2, two MRFCs 102 interact with a single MRFP 104 containing a plurality of media processing resources, represented by media adaptation resources 200. The interaction between MRFCs and MRP are depicted by arrows 204 and 208.

Arrows 204 represents typical control and response messages between MRFCs 102 and MRFP 104. For example, each MRFC 102 may request a media adaptation resource 200 of the MRFP 104 using an MRFP-compatible media processing instruction message (e.g., H.248 MEGACO message). MRFP 104 may receive the request message. If no resources are available, MRFP 104 may send an error or no resource available response message. If a resource 200 is available, MRFP 104 may respond with connection information (e.g., network address and port) for resource 200. Using the connection information provided by MRFP 104, a media stream (e.g., real-time protocol (RTP) media stream) may be routed through media adaptation resource 200. In one embodiment, media adaptation resource 200 converts the media stream between a format used by a source (e.g., a mobile phone) and a format supported by the destination (e.g., a VoIP phone).

Arrows 208 represent messages for requesting and providing resource information related to MRFP 104, such as resource capacity, resource usage, and resource availability. In one embodiment, resource requests or utilization audits may be periodic. For example, an MRFC 102 may send a request message at intervals (e.g., every two minutes) to MRFP 104 for triggering MRFP 104 to provide resource information, such as a resource utilization ratio (e.g., resources available to resource capacity or resources in use to resource capacity). In a second example, MRFP 104 may send resource information periodically to one or more MRFCs 102 (or other appropriate element) without receiving a request message. In an embodiment where one MRFC 102 receives resource information but other MRFCs 102 do not, the receiving MRFC 102 may share resource information with other MRFCs 102. For example, an MRFC 102 may share resource information with its standby elements or with MRFCs 102 within its same geographic location or controller group. In another embodiment, audits may be triggered by certain events or actions, such as when a new network element is added to an LRG 106, network load reaches or surpasses a threshold, or by request (e.g., of a network operator). In a third embodiment, audits or updates may be automatic. For example, MRFP 104 may send messages (e.g., to one or more MRFCs 102) whenever resource information changes. If resources are added, removed or freed, an MRFP 104 may automatically inform MRFCs 102, such as MRFCs 102 that may or may not be aware of the changes.

In the embodiment illustrated in FIG. 2, media adaptation resources 200 may interact with one or more packet networks, such as packet network 210. For example, packets (e.g., of a RTP media stream) may be directed through a network interface card (NIC) 202 of MRFP 104 to an available resource 200. The packets may reach a resource 200 through a mapped port of NIC 202, such as a user datagram protocol (UDP) port.

Media processing resources, such as media adaptation resources 200, may be associated with physical parts or components of MRFPs 104. For example, virtual resources may be located at a DSP 212 or voice card 214 in an MRFP 104. In one embodiment, LRGs 106 may be based on one or more portions of physical components. For example, a first logical group 106 may include resources 200 on DSP card 212, a second logical group 106 may include resources 200 on a second DSP card 212, and a third logical group 106 may include resources 200 on a second third DSP card 212 and resources 200 on voice card 214.

Figure 3:
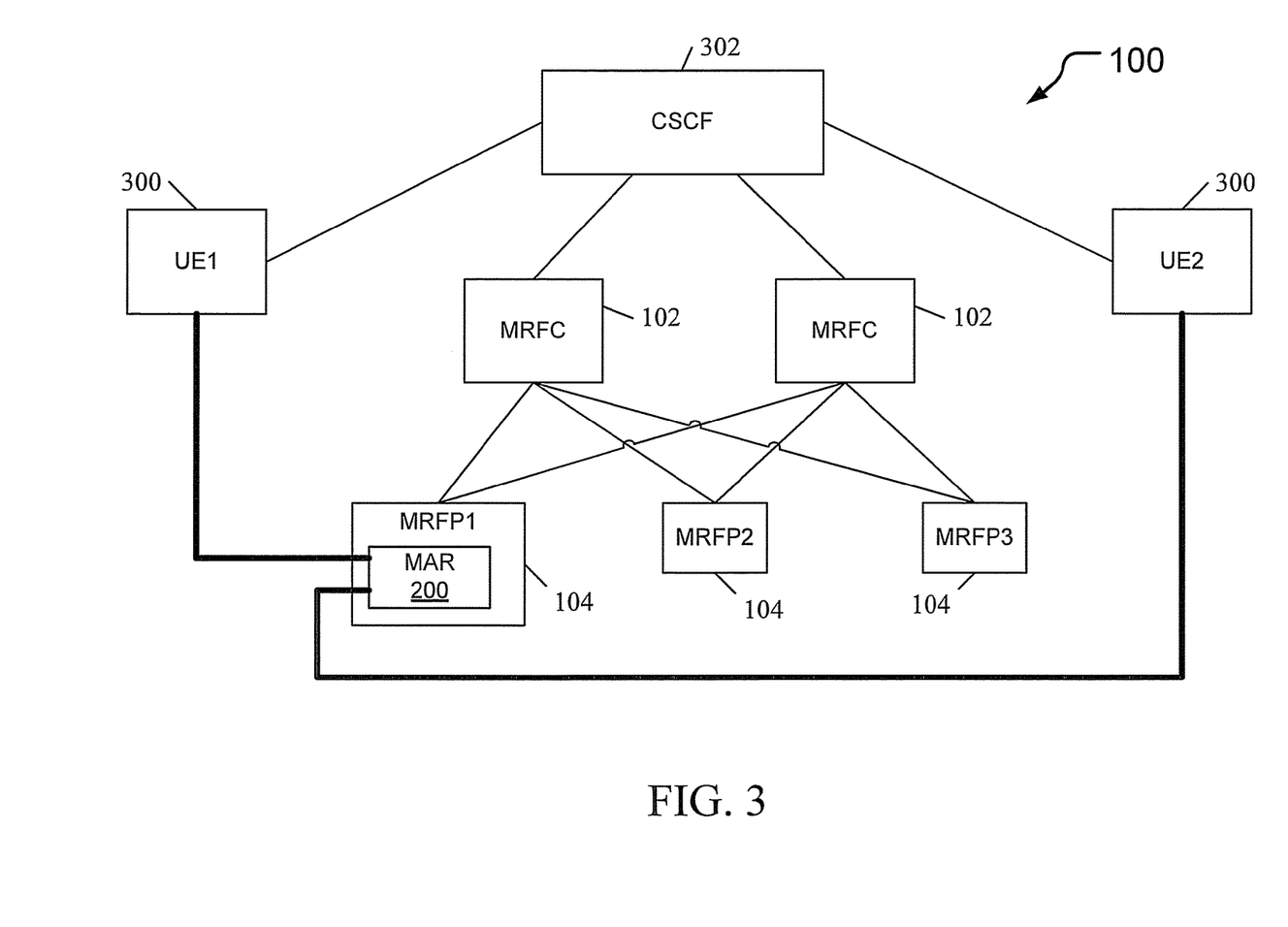
FIG. 3 is a block diagram illustrating an exemplary system for requesting and providing virtual resources according to an embodiment of the subject matter described herein.

FIG. 3 illustrates MRFP 104 providing a media-adaptation resource 200 according to an embodiment of the present subject matter herein. In the embodiment illustrated in FIG. 3, next generation network (NGN) 100 includes loosely coupled MRFCs 102 and MRFPs 104. NGN 100 may include or interact with mobile networks, including but not limited to second generation (2G) and third generation (3G) networks. In one embodiment, NGN 100 is an IMS network that may include gateway nodes to other networks or to networks using other protocols. For example, IMS network 100 may include general packet radio services (GPRS) nodes for communicating with a third generation (3G) mobile network. IMS network 100 may include a gateway GPRS support node (GGSN), which may serve a number of multiple 3G mobile phones or stations. The GGSN may provide tunneling to mobile stations for reaching IMS network 100 or other networks, and thus operate as an aggregation point for user equipment associated with the GPRS network. Examples of user terminals or user equipment 300 include personal computers, hand-held devices, mobile phones, mobile stations, mobile smart devices, personal digital assistants (PDAs), or other devices that communicate with network 100.

In the embodiment illustrated in FIG. 3, user equipment 1 (UE1) 300 may communicate or attempt to communicate with user equipment 2 (UE2) 300. For example, UE1 300 may attempt to establish a voice call or other media stream with UE2 300. In one embodiment, UE1 300 may be associated with a first network (e.g., a general packet radio services (GPRS) network or a fixed line network) connected to NGN 100 and UE2 300 may be associated with a second network (e.g., a public data network (PDN), CDMA network, or WIMAX network) connected to NGN 100. During a procedure for setting up a voice call or other media stream between UE1 300 and UE2 300, signaling nodes of the one or more associated networks, including NGN 100, may attempt to negotiate a format for the media stream. If there is no codec or media stream format that is supported by both source and destination UEs (or their associated networks), MRFC 102 may be contacted for a transcoding application.

NGN 100 may include a call session control function (CSCF) 302 or other node for communicating with MRFC 102. For example, if UE1 300 is a mobile station in GPRS network, the SIP INVITE may be tunneled to a GGSN node. The GGSN may send the SIP INVITE via NGN 100 to CSCF 302. In one embodiment, CSCF 302 or other appropriate node may recognize that a media adaptation resource (MAR) 300 is needed for transcoding a media stream and may contact MRFC 102. For example, a serving CSCF (S-CSCF) 302 may send a SIP INVITE request to MRFC 102 requesting a MAR 200. MRFC 102 may generate an MRFP-compatible media processing instruction message (e.g., an H.248 MEGACO message) requesting use of a MAR 200. MRCF 102 may send the instruction message to MRFP 104.

Selection entities may use one or more selection algorithms for selecting MRFPs 104 or media adaptation resources 200. Such selection algorithms may use a variety of information in making determinations. For example, the above-referenced, co-pending patent application discloses selecting resources based on available resources and IP topological proximity of a media-adaptation resource to one or more nodes used in the communication.

MRFCs 102, CSCFs 302, or other nodes that may communicate with MRFPs 104 (e.g., a GGSN or IBCF node) may be a MRFP selection entity for selecting MRFPs 104. As shown in the embodiment illustrated in FIG. 3, MRFC 102 may select an MRFP 104 of a plurality of MRFPs 104 using one or more factors. For example, MRFC 102 may use utilization audits of MRFPs 104 to determine that MRFP1 104 likely has available MARs 200. In a second example, MRFC 102 may select MRFP1 104 in part because MRFP 104 is in a preferred pool or LRG 106. In response to selecting MRFP1 104, MRFC 102 may send a resource request to MRFP1 104. MRFP1 104 may receive the request and, if no resources are available, MRFP1 104 may inform MRFC 102 that no resources are currently available. After being informed that no resources are currently available, MRFC 102 may send a request to other MRFPs 104 or may try MRFP1 104 again later.

MRFPs 104 may be resource selection entities for selecting resources to provide. For example, MRFP1 104 may receive a resource request. If resources are available, MRFP1 104 may use one or more selection algorithms, such as those described in the above-referenced, co-pending application, for selecting an appropriate MAR 200. After selecting MAR 200, MCFP1 104 may provide MAR 200 for use. For example, MRFP1 104 may send addressing information for MAR 200 (e.g., in a session description protocol (SDP) portion of a SIP message) to CSCF 302 or other appropriate node. This addressing information may be used to direct a media stream through MAR 200. As shown in the embodiment illustrated in FIG. 3, MAR 200 is inserted into the bearer path for transcoding a call (or a leg of a call) between UE1 300 and UE2 300.

Figure 4:
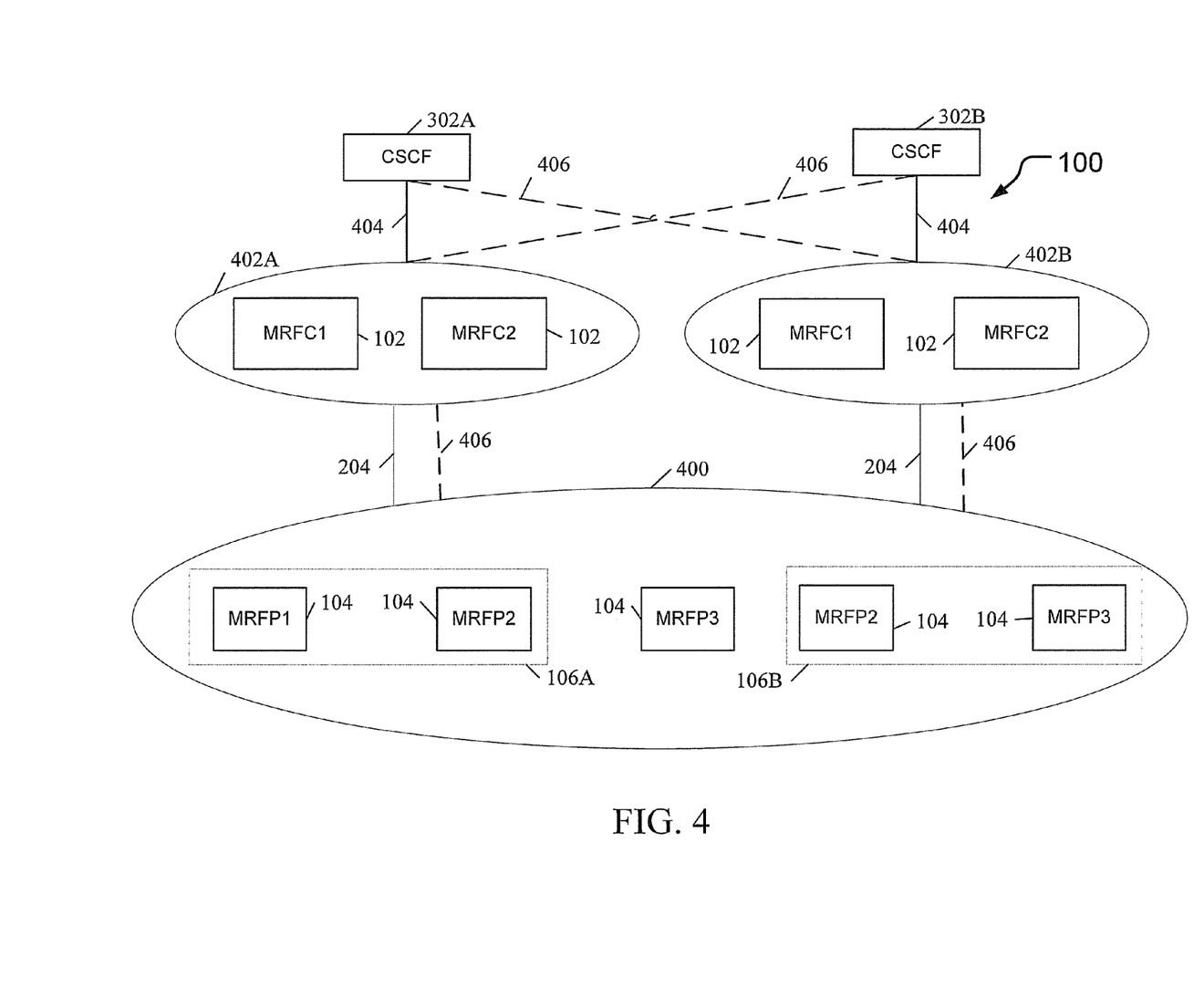
FIG. 4 is a block diagram illustrating an exemplary system for providing redundancy according to an embodiment of the subject matter described herein.

FIG. 4 is a block diagram illustrating an exemplary system for redundancy according to an embodiment of the subject matter described herein. Referring to FIG. 4, NGN 100 is an IMS network. IMS network 100 includes components, such as CSCFs 302, MRFCs 102, and MRFPs 104 which may include one or more redundancy features. For example, MRFCs 102 may include backup network interfaces and floating IP functionality for high availability and one or more standby machines for providing redundancy. In the embodiment illustrated in FIG. 4, CSCFs 302 communicate with MRFCs 102 to request media adaptation resources from MRFPs 104. For example, two user terminals may need IP to IP transcoding when communicating with each other. CSCF 302 may receive a SIP INVITE message from one of the two user terminals and determine a media adaptation resource is needed. CSCF 302 may transmit the SIP INVITE or another message to an MRFC 102 for requesting resources. MRFC 102 may select an MRFP 104 and send an MRFP-compatible (e.g., an H.248-based) message requesting that MRFP 104 provide an appropriate media adaptation resource 200.

MRFCs 102 and MRFPs 104 may be logically grouped based on one or more factors. In one embodiment, MRFCs 102 may be organized or grouped into two or more controller groups (CG) 402. For example, MRFCs 102 may be logically grouped based on geographical locations, service areas, customers, or service providers. In the embodiment illustrated in FIG. 4, MRFC1 102 and MRFC2 102 are logically grouped into CG 402A and MRFC3 102 and MRFC4 102 are logically grouped into CG 402B. While only two MRFCs 102 are shown in each CG 402, it will be appreciated that CGs 402 may include one or more MRFCs 102. In one embodiment, MRFCs 102 in each CG 402 may share a network address (e.g., using a floating IP configuration) for receiving messages from CSCFs 302. In a second embodiment, CSCFs 302 may use a load balancing algorithm or other method for selecting an MRFC 102 of a CG 402. Balancing signaling load can provide high stability as there is a low chance for MRFC overload.

It will be appreciated that components, such as CSCFs 302 and CGs 402, or MRFCs 102 therein, may have communication preferences with other MRFPs or groups of MRFPs (e.g., an LRG 106). For example, MRFCs 102 of CG 402A may request resources from LRG 106A before requesting resources from other MRFPs 104 and MRFCs 102 of CG 402B may request resources from LRG 106B before requesting resources from other MRFPs 104. In the embodiment illustrated in FIG. 4, CSCF 302A generally communicates with CG 402A and CSCF 302B generally communicates with CG 402B. MRFCs 102 in CG 402A and 402B may communicate with MRFPs 104 in resource pool 400. In one embodiment, resource pool 400 provides a high availability of MRFPs. For example, resource pool 400 may allow for no single point of failure in that any available media adaptation resource 200 may be used by any MRFC. Additionally, bearer load (e.g., transcoding load) may be balanced across resource pool 400. For example, MRFCs 102 may use a load balancing algorithm in selecting MRFPs 104. Balancing bearer load can provide high stability as there is a low chance for MRFP overload.

Referring to FIG. 4, solid lines 404 represent primary communication paths between components. Dashed lines 406 represent redundant or backup communication paths between components. As illustrated, CSCFs 302 may communicate with either CGs 402. MRFCs 102 in CG 402A and 402B may communicate with MRFPs 104 in resource pool 400. In one embodiment, CSCF 302A communicates with MRFCs 102 in CG 402A using a primary communication path. If MRFCs 102 in CG 402A fail or are unavailable, CSCF 302A may communicate with MRFCs 102 in CG 402B. Similarly, CSCF 302B communicates with MRFCs 102 in CG 402B using a primary communication path. If MRFCs 102 in CG 402B fail or are unavailable, CSCF 302B may communicate with MRFCs 102 in CG 402A. For example, CSCF 302B may forward communications to CG 402A. In the embodiment illustrated in FIG. 4, each CG 402 is capable of handling MRFP-related interactions for other CGs 402 if a failure occurs (e.g., no MRFC 102 is available to receive or process messages). For example, CG 402A may handle MRFP-related interactions for communications that typically are handled by CG 402B. MRFP-related interactions may include messages for requesting media adaptation resources capable of performing an IP to IP transcoding function.

Figure 5:
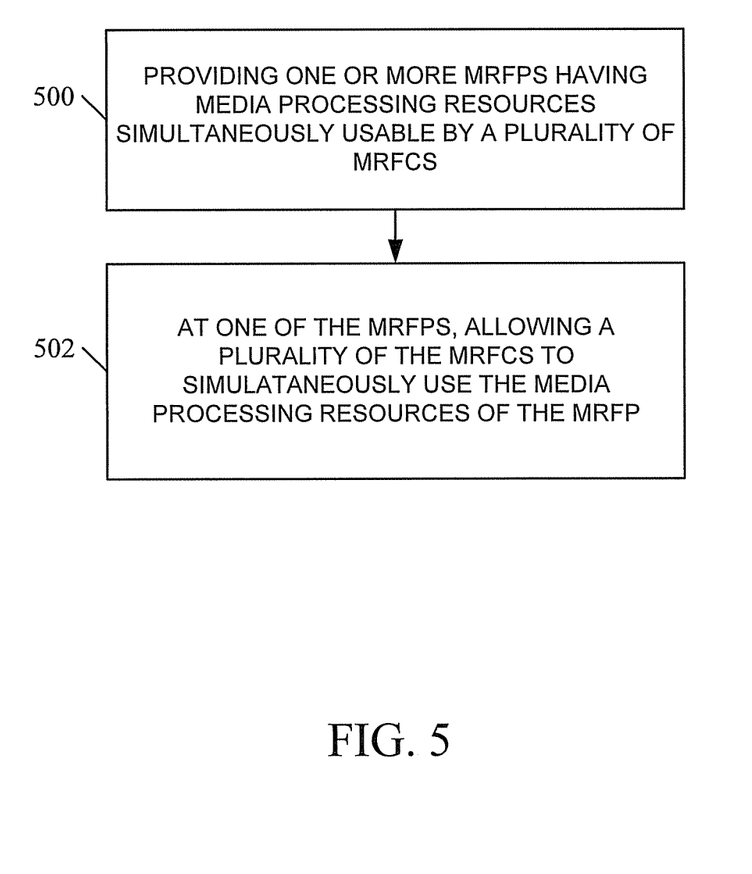
FIG. 5 is a flow chart illustrating an exemplary process for loose coupling of MRFCs and MRFPs according to an embodiment of the subject matter described herein.

FIG. 5 is a flow chart illustrating an exemplary process for loose coupling of MRFCs and MRFPs according to an embodiment of the subject matter described herein. This process will now be described with references to FIG. 2.

Referring to FIG. 5, at block 500, one or more MRFPs are provided, the MRFPs 104 having media processing resources simultaneously usable by a plurality of MRFCs 102. In one embodiment, the media processing resources are media adaptation resources for Internet protocol (IP) to IP transcoding. For example, as illustrated in FIG. 2, a plurality of media adaptation resources 200 are at DSP card 212 and voice card 214 in MRFP 104. Resources 200 may be requested or used by MRFC1 102 and MRFC2 102 at any time, including simultaneously or concurrently.

At block 202, one MRFP allows a plurality of MRFCs to simultaneously use the media processing resources of the MRFP. For example, as illustrated in FIG. 2, MRFC1 102 and MRFC2 102 may request media adaptation resources 200 from MRFP 104. MRFP 104 may provide addressing information for a MAR 200 on DSP 212 to MRFC1 102. MRFP 104 may also provide addressing information for a second MAR 200 on DSP 212 to MRFC2 104. MARs 200 may be used by MRFC1 102 and MRFC2 102 at any time, including simultaneously or concurrently. Arrow 206A represents a bearer path using one MAR 200 for IP to IP transcoding of a media stream. Arrow 206B represents a bearer path using a second MAR 200 for IP to IP transcoding of a second media stream.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for loose coupling of media resource function controllers (MRFCs) and media resource function processors (MRFPs), the method comprising:
   providing one or more MRFPs having media processing resources simultaneously usable by a plurality of MRFCs; and
   at one of the MRFPs, allowing a plurality of MRFCs to simultaneously use the media processing resources of the MRFP, wherein the plurality of MRFCs is organized into two or more controller groups, wherein each controller group is operable to handle MRFP-related interactions for other controller groups if a failure occurs.

2. The method of claim 1 wherein the media processing resources are media adaptation resources for Internet protocol (IP) to IP transcoding.

3. The method of claim 2 wherein media-adaptation resources of the one or more MRFPs are logically grouped into a pool of media-adaptation resources.

4. The method of claim 3 wherein an MRFC of the plurality of MRFCs requests a media-adaptation resource from the pool of media-adaptation resources capable of performing an IP to IP transcoding function.

5. The method of claim 4 wherein requesting the media-adaptation resource from the pool of media-adaptation resources capable of performing an IP to IP transcoding function includes selecting an MRFP and allowing the selected MRFP to determine an appropriate media-adaptation resource to provide.

6. The method of claim 4 wherein an MRFP of the one or more of MRFPs provides a media-adaptation resource from the pool of media-adaptation resources capable of performing an IP to IP transcoding function.

7. The method of claim 1 comprising:
   configuring the plurality of MRFCs and the one or more MRFP for loose coupling.

8. The method of claim 7 wherein configuring the MRFCs and MRFPs includes configuring using at least one of:
   a predetermined list;
   an element management system (EMS) node;
   a network operator; and
   network analysis.

9. The method of claim 1 wherein an MRFC of the plurality of MRFCs comprises functionality in one of:
   a media gateway controller (MGC);
   a policy decision function (PDF);
   a softswitch;
   a media server;
   a mobile switching center (MSC) server;
   an application server (AS);
   a media resource function (MRF); and
   an interconnect border control function (IBCF).

10. The method of claim 1 wherein an MRFP of the one or more MRFPs comprises functionality in one of:
    a media gateway (MG);
    a gateway function;
    a media server;
    a transition gateway (TrGW);
    an interconnect border gateway function (I-BGF);
    a core border gateway function (C-BGF);
    a media resource function (MRF); and
    an access border gateway function (A-BGF).

11. The method of claim 1 comprising:
    receiving, by at least one MRFC, resource usage information related to an MRFP.

12. The method of claim 11 wherein receiving resource usage information includes periodically auditing the MRFP for current usage and capacity statistics.

13. The method of claim 12 wherein current usage and capacity statistics includes information for determining number of available media-adaptation resources for use and total number of media-adaptation resources of the MRFP.

14. The method of claim 1 wherein MRFP-related interactions include requesting media-adaptation resources.

15. A system for loose coupling of media resource function controllers (MRFCs) and media resource function processors (MRFPs), the system comprising:
    one or more MRFPs having media processing resources simultaneously usable by a plurality of MRFCs; and
    a plurality of MRFCs for simultaneously using the media processing resources of the one or more MRFPs, wherein the plurality of MRFCs is organized into two or more controller groups, wherein each controller group is operable to handle MRFP-related interactions for other controller groups if a failure occurs.

16. The system of claim 15 wherein the media processing resources are media adaptation resources for Internet protocol (IP) to IP transcoding.

17. The system of claim 15 wherein the plurality of MRFCs and the one or more MRFP are configured for loose coupling.

18. The system of claim 15 wherein the plurality of MRFCs are configured with information about one or more MRFPs capable of providing media-adaptation resources using at least one of:
    a predetermined list;
    an element management system (EMS) node;
    a network operator; and
    network analysis.

19. The system of claim 15 wherein an MRFC of the plurality of MRFCs comprises functionality in one of:
   a media gateway controller (MGC);
   a policy decision function (PDF);
   a softswitch;
   a media server;
   a mobile switching center (MSC) server;
   an application server (AS);
   a media resource function (MRF); and
   an interconnect border control function (IBCF).

20. The system of claim 15 wherein an MRFP of the one or more MRFPs comprises functionality in one of:
   a media gateway (MG);
   a gateway function;
   a media server;
   a transition gateway (TrGW);
   an interconnect border gateway function (I-BGF);
   a core border gateway function (C-BGF);
   a media resource function (MRF); and
   an access border gateway function (A-BGF).

21. The system of claim 15 wherein at least one MRFC receives resource usage information related to an MRFP.

22. The system of claim 21 wherein receiving resource usage information includes periodically auditing the MRFP for current usage and capacity statistics.

23. The system of claim 22 wherein current usage and capacity statistics includes information for determining number of available media-adaptation resources for use and total number of media-adaptation resources of the MRFP.

24. The system of claim 15 wherein media-adaptation resources of the one or more MRFPs are logically grouped into a pool of media-adaptation resources.

25. The system of claim 24 wherein an MRFC of the plurality of MRFCs requests a media-adaptation resource from the pool of media-adaptation resources capable of performing an IP to IP transcoding function.

26. The system of claim 25 wherein requesting the media-adaptation resource from the pool of media-adaptation resources capable of performing an IP to IP transcoding function includes selecting an MRFP and allowing the selected MRFP to determine an appropriate media-adaptation resource to provide.

27. The system of claim 26 wherein an MRFP of the one or more MRFPs provides a media-adaptation resource from the pool of media-adaptation resources capable of performing an IP to IP transcoding function.

28. The system of claim 15 wherein MRFP-related interactions include requesting media-adaptation resources.

29. A non-transitory computer readable medium having stored thereon executable instructions that when executed by the processor of a computer control the computer to perform steps comprising:
   providing one or more MRFPs having media processing resources simultaneously usable by a plurality of MRFCs; and
   at one of the MRFPs, allowing a plurality of MRFCs to simultaneously use the media processing resources of the MRFP, wherein the plurality of MRFCs is organized into two or more controller groups, wherein each controller group is operable to handle MRFP-related interactions for other controller groups if a failure occurs.

* * * * *